United States Patent
Scott

(10) Patent No.: US 9,500,490 B1
(45) Date of Patent: Nov. 22, 2016

(54) SPEED CONTROL DISPLAY SYSTEM AND METHOD

(71) Applicant: Komatsu America Corp., Rolling Meadows, IL (US)

(72) Inventor: David J. Scott, Washington, IL (US)

(73) Assignee: Komatsu America Corp., Rolling Meadows, IL (US)

( * ) Notice: Subject to any disclaimer, the term of this patent is extended or adjusted under 35 U.S.C. 154(b) by 0 days.

(21) Appl. No.: 14/815,468

(22) Filed: Jul. 31, 2015

(51) Int. Cl.
*G05D 1/00* (2006.01)
*G01C 21/34* (2006.01)
*B60K 35/00* (2006.01)
*B60Q 9/00* (2006.01)

(52) U.S. Cl.
CPC .......... *G01C 21/3469* (2013.01); *B60K 35/00* (2013.01); *B60Q 9/00* (2013.01); *B60K 2350/1076* (2013.01)

(58) Field of Classification Search
CPC .. G01C 21/30; G01C 21/34; G01C 21/3415; G01C 21/343; G01C 221/3446; G01C 21/3638; G01C 21/3658
USPC ..................... 701/400–541, 25; 340/988–996
See application file for complete search history.

(56) References Cited

U.S. PATENT DOCUMENTS

| 5,177,684 A | 1/1993 | Harker |
| 5,485,161 A | 1/1996 | Vaughn |
| 2005/0000703 A1 * | 1/2005 | Furuno ................. G01G 19/08 172/2 |
| 2010/0216498 A1 * | 8/2010 | Mintah .................. H04L 45/04 455/507 |
| 2015/0029017 A1 * | 1/2015 | Thoreson .............. B60K 35/00 340/461 |
| 2015/0178859 A1 * | 6/2015 | Takeda .................. G06Q 50/02 705/7.24 |
| 2015/0198736 A1 * | 7/2015 | Clar ...................... G01C 21/20 702/5 |
| 2015/0269685 A1 * | 9/2015 | Takeda ................. E02F 9/2054 705/7.22 |
| 2016/0019497 A1 * | 1/2016 | Carvajal ............... G06Q 10/08 701/519 |
| 2016/0134995 A1 * | 5/2016 | McCoy ................. H04W 4/008 455/41.2 |

* cited by examiner

*Primary Examiner* — Muhammad Shafi

(74) *Attorney, Agent, or Firm* — Brinks Gilson & Lione

(57) ABSTRACT

A method for determination of vehicle characteristics in reference to an optimum path and determination of machine performance adjustment based on a calculated time of arrival relative to an optimum time of arrival. The method provides a resultant instantaneous display of modified vehicle settings to the operator.

20 Claims, 8 Drawing Sheets

SPEED CONTROL DISPLAY SYSTEM AND METHOD

BACKGROUND

1. Technical Field

The invention relates to operator display instrumentation for vehicular speed control. In particular, the invention relates to planned arrival time adjustment based on anticipated arrival time from the current vehicle position. The invention includes an operator display for an adjusted machine operation for an optimized metric, which may be used concurrently with an automatic adjusting machine intervention controls system.

2. Background Information

Operator control of vehicles, such as off-highway large dump trucks in mining operations, may require arrival at a certain location at a certain time to prevent loss of efficiency for a multiple machines scheduled plan. As in a mining application example, a loading equipment tool, such as an electric power wire rope shovel, will lose efficiency of operation when waiting for the arrival of a haul truck.

Continuing with the mining application example, a solution for minimizing shovel waiting time is assignment of multiple haul trucks for hauling the material mined by the shovel, which in turn results in a waiting line queue of haul trucks waiting for their sequenced opportunity for the loading location where the shovel may load the respective haul truck. As a result, the haul trucks waiting in the queue may have missed some increased gains in efficiencies because of their operation in a manner using maximum power to achieve the lowest return trip time, when a more optimum mode of operation in the complete haul cycle might have been utilized.

Another deficiency which may result is the time spent in the waiting queue which causes machine components to have larger temperature hysteresis, such as found in the engine exhaust piping system, engine coolant system, hydraulics system, engine exhaust catalyst fluids system, etc. The highest temperatures are generally reached at maximum power settings and the lowest temperatures are generally reached while simply idling in the waiting queue. While waiting in the queue, the resulting lower temperatures reached may be sufficient to cause inadequate performance or lower performance for operator cabin heat generation or for catalyst exhaust system operations and perhaps cause a need for additional power consumption to increase these temperatures to an adequate level while waiting in queue.

Another deficiency is where limited overall space may exist to accommodate the waiting queue of trucks, which in turn causes congestion and low space clearance passage between trucks. Reduced passage spaces may cause a higher likelihood for collision damage and machine wear and tear through confined area movement mode of operations. This limited space problem may be reduced if the number of waiting trucks is reduced.

The shortcomings of the prior art are addressed by the present invention through a method and system for speed and/or engine control to adjust an estimated time of arrival.

SUMMARY

According to one embodiment, a method for adjusting the arrival time of a vehicle at a destination may include the steps of determining a real-time position of the vehicle relative to a stored optimum path of the vehicle, wherein the optimum path is a feature of a vehicle relative to a vehicle haul cycle, determining a real-time speed of the vehicle, determining an estimated arrival time of the vehicle at a destination based on the determined real-time speed and the determined real-time position of the vehicle relative to the stored optimum path, determining a deviation of the estimated arrival time relative from a stored optimum arrival time, initiating automatic control of the vehicle, reducing a power setting of the vehicle without intervention by a vehicle operator if the estimated arrival time is before the stored optimum arrival time, determining if the vehicle can achieve the stored optimum arrival time by using a maximum power setting of the vehicle, wherein the maximum power setting is not available outside automatic control of the vehicle, increasing the power setting of the vehicle without intervention by the vehicle operator if the estimated arrival time is after the stored optimum arrival time and if the vehicle can achieve the stored optimum arrival time by using the maximum power setting of the vehicle, updating a display module to indicate the reduced power setting or the increased power setting, and updating the display module to indicate if the estimated arrival time is before or after the stored optimum arrival time.

According to another embodiment, a method for storing characteristic information of a vehicle along a path may include the steps of receiving information regarding characteristics of the vehicle at points along a vehicle path, storing the received information regarding characteristics of the vehicle in a memory, wherein the memory is configured to store multiple iterations of vehicle characteristics along the vehicle path, determining if the vehicle as at the end of the path, if the vehicle is at the end of the path: determining that an acceptable average set of vehicle characteristics along the vehicle path is not stored, retrieving stored vehicle characteristics from the memory, generating vehicle characteristics along the vehicle path from the stored vehicle characteristics, storing the generated vehicle characteristics along the vehicle path in the memory, generating an acceptable average set of vehicle characteristics along the vehicle path from the generated vehicle characteristics along the vehicle path, if the vehicle is not at the end of the path: determining that an acceptable average set of vehicle characteristics along the vehicle path is stored, determining a deviation of the information regarding characteristics of the vehicle from the average set of vehicle characteristics along the vehicle path, determining, based on the determined deviation, if the vehicle is on the path.

According to another embodiment, a display module for an off-highway dump truck vehicle may include a symbol representing the vehicle, a time scale, a time scale multiplier configured to modify a size of the time scale, an indication member configured to denote a position on the time scale, wherein the position of the indication member relative to the symbol indicates if an estimated arrival time of the vehicle at a destination is before or after a stored optimum arrival time, wherein the estimated arrival time of the vehicle is determined based on a real-time speed and a real-time position of the vehicle relative to a stored optimum path, and a power setting modification indicator configured to indicate if a reduced power setting or an increased power setting is active, wherein the reduced power setting is activated without intervention by a vehicle operator if the estimated arrival time is before the stored optimum arrival time, and wherein the increased power setting is activated without intervention by the vehicle operator if the estimated arrival time is after the stored optimum arrival time and if the vehicle can achieve the stored optimum arrival time by using a maximum power setting of the vehicle, wherein the maximum power setting is not activatable by the vehicle operator Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The embodiments described below may be more fully understood by reading the following description in conjunction with the drawings, in which.

DETAILED DESCRIPTION OF THE DRAWINGS AND THE PRESENTLY PREFERRED EMBODIMENTS

Figure 1:
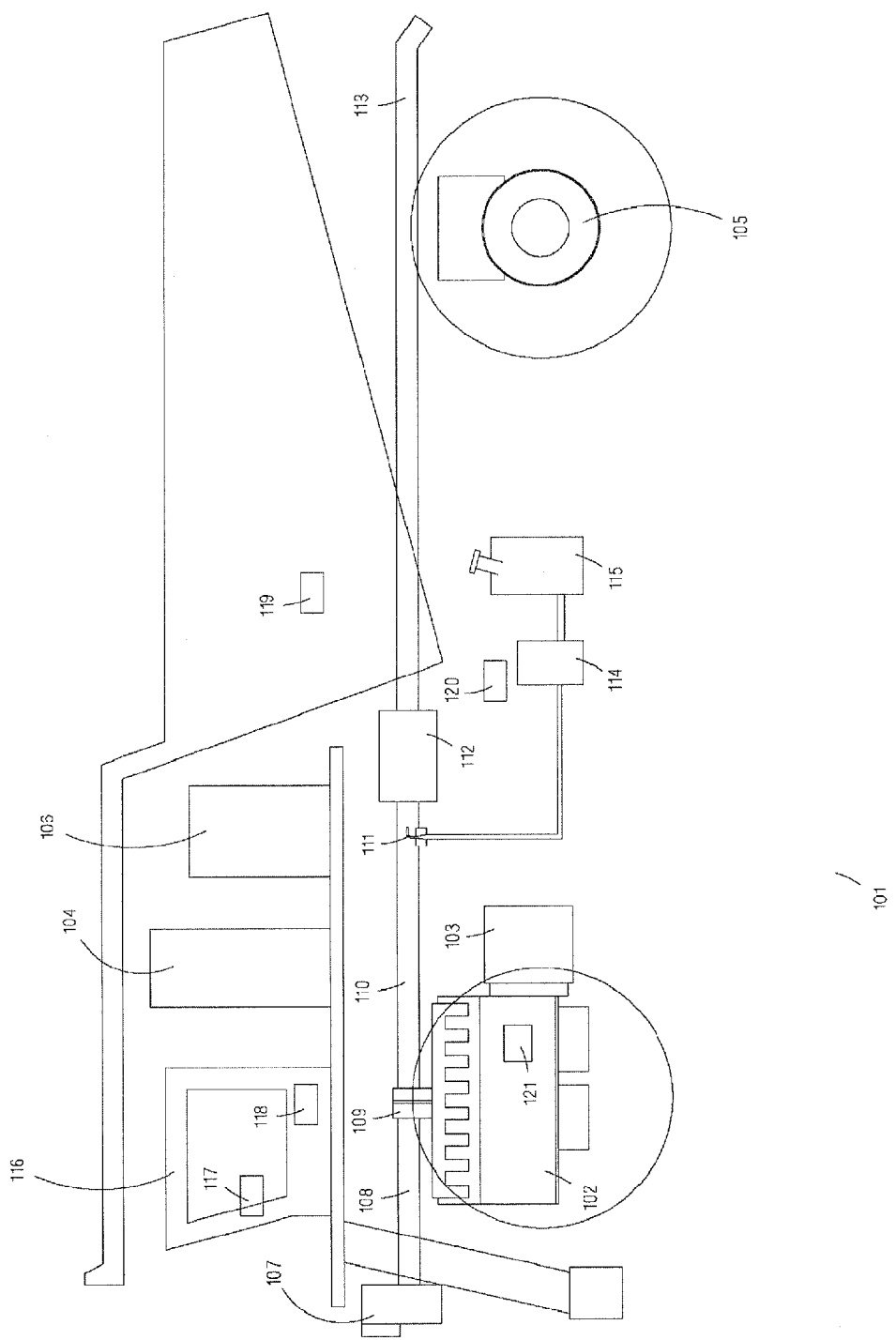
FIG. 1 is a diagram of a vehicle according to one embodiment.

FIG. 1 illustrates a diagram of an example vehicle 101 which may represent an off-highway mining truck used for haulage of material in a mining environment. The example vehicle 101 includes an engine 102 connected to an electrical generation assembly 103 that in turn through electrical controls 104 transfers in a controlled manner electrical energy to electrical traction motors 105 that provide tractive force for the vehicle 101. The electrical traction motors 105 may, as required, act in retarding action by extracting rotation energy and dissipating the resultant electrical energy to the atmosphere as heat through a retarding grid assembly 106. The engine controller 121 monitors and controls many aspects of the engine 102 and allows for both stored and real time data extraction. The air system for the engine includes air cleaner assemblies 107, air intake piping 108, turbo charger 109, exhaust plumbing 110, exhaust fluid injector 111, catalyst reaction chamber 112, exhaust tail pipe plumbing 113. The exhaust treatment system includes the exhaust fluid injector 111, catalyst reaction chamber 112, valves system 114, fluid reservoir 115 and exhaust treatment system controller 120. The operator controls cabin 116 includes operator interfaces 117 that include instrumentation, switches, levers, displays, wheels, and other such kinds of human to machine interfaces. Machine controllers 118 and other systems controllers such as a payload measurement system controller 119 are also common to example vehicle 101. The example vehicle 101 is purely for description and not to be construed limiting the invention to only this example.

Figure 2:
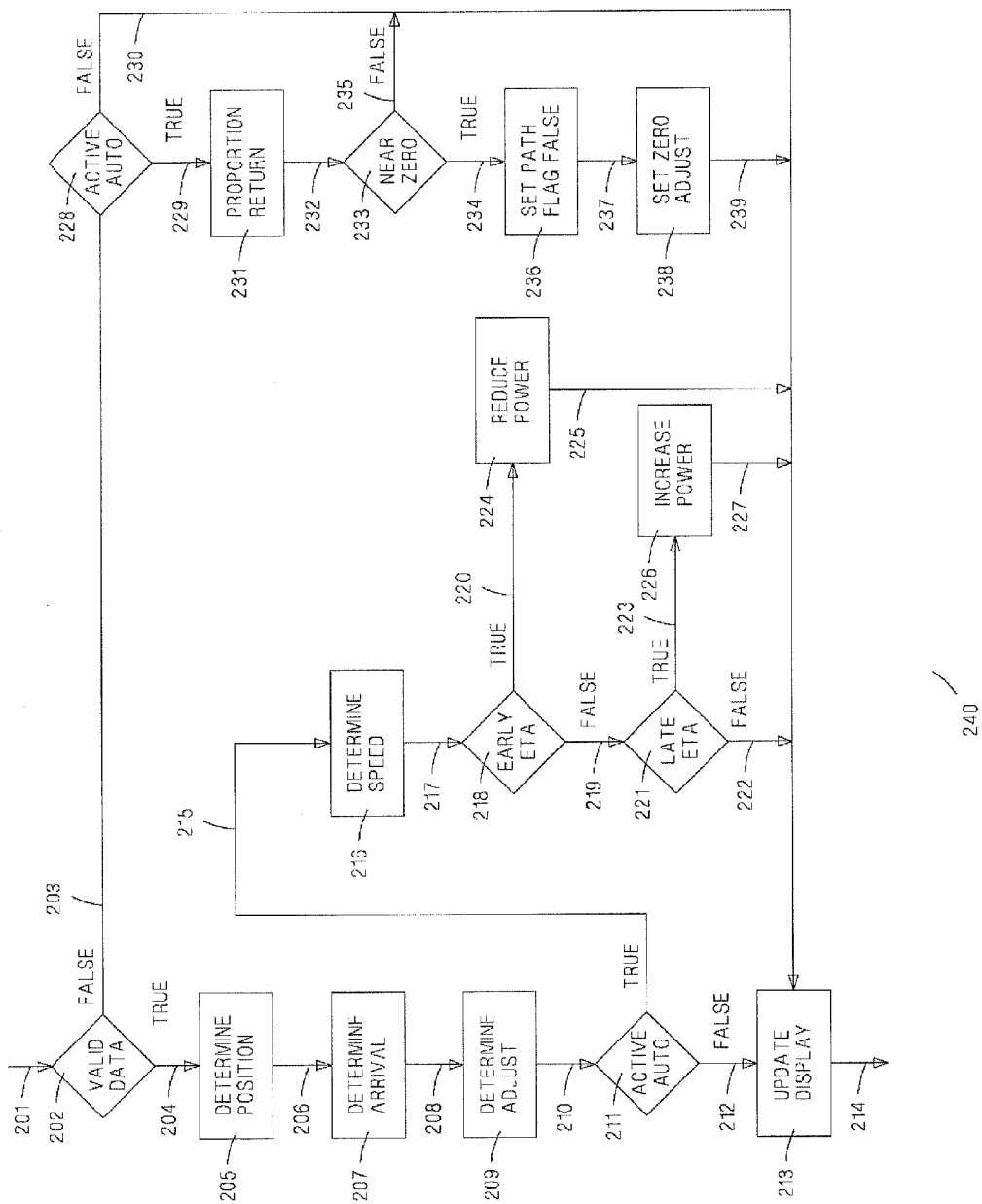
FIG. 2 is a process flow diagram for an operator interface update process according to one embodiment.
Figure 3:
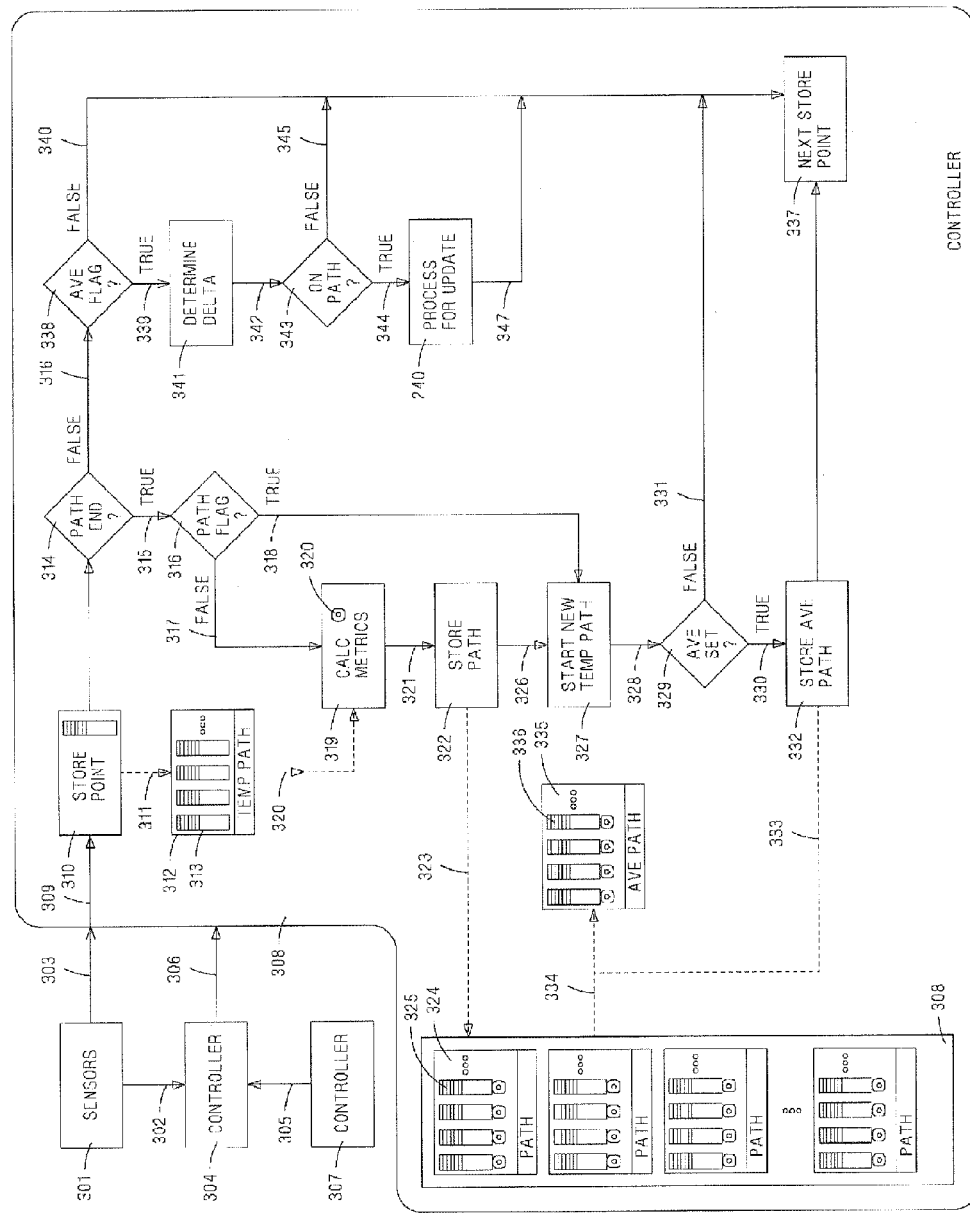
FIG. 3 is a process flow diagram for a controller of an operator interface according to one embodiment.

FIG. 2 is a process for updating vehicle operating parameters. FIG. 3 is a process for storing vehicle information.

FIG. 3 shows an example embodiment flow process diagram for storing characteristic information of a vehicle. The processor controller 308 may receive vehicle characteristic information as may be available or derived from a controller 304 following segment 306. Controller 304 may receive or derive characteristic data from sensors 301 following segment 302 directly or from another controller 307 following segment 305. The processor controller 308 may receive characteristic data directly from sensors 301 following segment 303. Segment 303 and segment 306 in turn join segment 309 to store point block 310 where the instant record of data received is then stored along segment 311 into temp path block 312, which collects sequentially these storage instances each time. For example, temp path block 312 shows four instances of stored data, as depicted by the four columns in temp path block 312. Any number of instances of stored data may be included in temp path block 312.

Store point block 310 in turn leads to decision diamond 314 where it is determined if the vehicle is at the end of the path, such as if the vehicle is at the end of a route in time or location, with true segment 315 and false segment 316. If the vehicle is not at the end of the path, following false segment 316 leads to decision diamond 338 where determination of stored valid average path is done with false segment 340 and true segment 339. A valid average path is stored if an acceptable average of previously stored paths is available. For example, an average of two stored paths may not be acceptable because the data set is too limited, but an average of three or more stored paths may be acceptable. Any number of stored data paths may be deemed to be acceptable to have a valid average path. If a stored valid average path is not available, false segment 340 leads to ending loop for the current data storage instance and begins the next data storage instance loop, in which case further data points will be stored. If a stored valid average path is available, true segment 339 leads to determine delta block 341 where the offset from the stored valid average path is calculated.

Determine delta block 341 leads to decision diamond 343 following segment 342 where determination if the vehicle's actual path is reasonably still equal to a stored valid average path 335, with true segment 344 and false segment 345. A tolerance may be included in decision diamond 343 for determining if the vehicle's actual path is equal to a stored valid average path, as such an actual path that deviates a small amount, such as 10%, from a stored valid average path may still be considered equal to the stored valid average path. The tolerance may be varied based on operating conditions. If decision diamond 343 determines that the actual path is not equal to the stored valid average path, i.e. the vehicle is not on the stored valid average path, then false segment 345 joins segment 340 to block 337, in which case further data points will be stored. If decision diamond 343 determines that the actual path is equal to the stored valid average path, true segment 344 leads to process for update block 240, which in turn follows segment 347 to segment 340. Process update block 240 is where the operator display and machine functionality modifications are updated as required with the example discussed in relation to FIG. 2.

Continuing with FIG. 3, if the vehicle is not at the end of the path, following true segment 315 leads to decision diamond 316 where determination for invalid path data for storage occurs with false segment 317 and true segment 318. For example, if valid sets of data points for a path are stored the path flag in decision diamond 316 will be true. If invalid sets of data points for a path are stored the path flag in decision diamond 316 will be false. The validity or invalidity of data may be determined based on the quantity or quality of data, such as if less than an acceptable amount of data is stored or if erroneous data is stored. Other characteristics may be used to determine the validity or invalidity of data. When invalid sets of path data points are stored, false segment 317 leads to block 319 which in turn retrieves data along segment 320 from temp path block 312 and processes for additional derivations of characteristics 320 and joins the additional characteristics 320 to each datum set 313. In this way, a valid set of data points for a path may be generated. Segment 321 leads to store path block 322 where the generated valid set of data points are stored. Segment 323 takes the data of 312 with data 320 from block 319 to a storage area in processor controller 308, where the specific characteristics and derived characteristics 325 for the course of the just completed and validated path 324 are stored. Example types of data that can be stored in each datum set 313 may include time, distance, engine rotation speed, engine output power, drive wheel motor electric current, drive wheel motor electric volts, engine coolant fan rotation speed, engine coolant temperature, payload material mass, engine fuel rate, payload, front suspension pressure, rear suspension, and body down proximity switch status. Example types of data that can be derived in 320 may include drive performance, engine fuel performance, engine fan power, drive line fan power, fan total power, and drive wheels total power. Example types of data that can be derived for the path 324 may include fan total cumulative energy, ground power propulsion energy, engine power energy, drive power energy per ton, and engine power energy per ton. Other types of data may be stored or derived.

Storage area in processor controller 308 may include multiple sets of valid path data points. When a set number of stored path data sets, according to one embodiment, are determined not yet existing at decision diamond 329, true segment 330 leads to block 332 which invokes segment 333 and segment 334, which creates an average path data set from the valid sets of path data points stored in processor controller 308. Ave path block 335 is a derived set of data 336 for a path 335. According to another embodiment, this data set 335 may be derived from other sources of data base sets, both inherent to the vehicle or off the vehicle, derived and then received to the processor controller 308 through a controller 304 along segment 306. Following segment 326 to block 327 then leads with segment 328 to decision diamond 329 where it is determined if an invalid data set for data set 335 exists, which and has false segment 331 and true segment 330. If an invalid data set exists, following false segment 331 joins segment 340 to block 337, named next store point, in which case further data points will be stored. The process described in relation to FIG. 3 will continuously update the stored average path data with the new data points that are collected and stored. In this way, the stored average path continuously reflects the data stored as the vehicle completes multiple paths.

FIG. 2 is a flow process diagram of one example method for the update process for update block 240 shown in FIG. 3. Process block 240 is where the operator display and machine functionality modifications are updated as required. The process for update begins at input segment 201 to decision diamond 202 for determination if valid data is present, which has false segment 203 and true segment 204. If valid data is not present, following false segment 203 leads to decision diamond 228 for determination whether machine auto controls are active, which in turn has false segment 230 and true segment 229. Following false segment 230 leads to update display block 213 and exits the process at segment 214.

Continuing with FIG. 2, if machine auto controls are active, following true segment 229 leads to proportion return block 231 where adjustment towards a zero modification command is done. If valid data is not present, as determined in decision diamond 202, it may not be desirable to operate the machine with automatic controls because the data the automatic controls are based on may not be reliable. However, rather than immediately deactivating automatic controls, it may be desirable to gradually return the machine to non-automatic control settings. Decision diamond 233 determines if the modification command is near zero, which determines if the automatic controls modification commands are near the normal non-automatic control operation of the machine, such that the modifications are minimal. Decision diamond 233 has false segment 235 and true segment 234. If the automatic controls modification commands are not near zero, i.e. the modifications are not minimal, following false segment 235 leads to join segment 230 to update display block 213. The automatic controls will gradually be reduced in proportion return block 231 until they are near zero. If the automatic controls modification commands are near zero, following true segment 234 leads to set path flag false block 236 which accomplishes that a full disabled state of active controls is established, i.e. that the automatic controls modification commands are at or near off. Block 236 then leads to segment 237 to set zero adjust block 238 where adjustment of the automatic controls modification commands is set to zero to insure zero adjustment is accomplished. Block 236 then leads to segment 239 to join segment 230 to update display block 213.

Continuing with FIG. 2 at true segment, 204, which determined that valid data is present, leads to determine position block 205, which determines a real time position relative to the optimum path. The path of the vehicle may refer to a feature of the vehicle relative to a haul cycle, such as the haul cycle of a mining vehicle traveling to and from a loading shovel. The path may refer to a time metric of the vehicle, such as if the vehicle is early or late relative to a desired arrival time. Additionally or alternatively, the path of the vehicle may refer to the location of the vehicle relative to a haul cycle route. The optimum path may result in the vehicle reaching a destination at an optimum time. The optimum time may or may not be the earliest possible time for the vehicle to reach its destination. The optimum time may be a time that results in minimizing periods of inactivity of the vehicle. For example, the optimum time for a haul truck to reach its loading point may be a time that coincides with the time that equipment is available to load the haul truck with material. Such an optimum time may minimize the time the haul truck is idling in a waiting queue. Reducing idle time may improve fuel efficiency by allowing the vehicle to operate in its most efficient state throughout the haul cycle.

Determine position block 205 in turn follows segment 206 to determine arrival block 207 which determines an estimated arrival time based on the stored optimum path data for that distance point in the haul cycle. In this way, the estimated arrival time may be determined in real time at any point along the path. This in turn follows segment 208 to determine adjust block 209 where an offset from the optimum path to the real time data point is established. The offset may be a time that the machine is ahead or behind a reference point, such as an optimum arrival time. Additionally or alternatively, the offset may be a distance that the machine is away from a point on the route or away from the entire route. This in turn leads by segment 210 to decision diamond 211 for determination of whether active machine controls intervention is possible with process true segment 215 and process false segment 212. Following false segment 212 leads to update display block 213.

Continuing with FIG. 2 at true segment 215, which determined that active machine controls intervention is possible, leads to determine speed block 216 where a real time speed comparison is determined relative to the optimum path, which in turn follows segment 217 to decision diamond 218 for determination if the estimated arrival time is early with reference to an optimum arrival time, with true segment 200 and false segment 219. Decision diamond 218 determines if the estimated arrival time is earlier than the optimum arrival time. If the estimated arrival time is earlier than the optimum arrival time, following true segment 220 leads to reduce power block 224 where active controls makes a reduced power setting which in turn follows segment 225 to segment 230 to update display block 213. Reducing the power settings may revise the estimated arrival time to the optimum arrival time. If the estimated arrival time is later than the optimum arrival time, following false segment 219 leads to decision diamond 221 for determination of late estimated time of arrival based on the maximum performance characteristic of the machine with true segment 223 and false segment 222, which determines if the estimated arrival time can equal the optimum arrival time by using the maximum performance of the machine. Following true segment 223 leads to increase power block 226 which requests maximum drive system power setting. Maximum drive system power settings may be more than a standard machine provides for the operator's discretionary use. Increase power block 226 leads to segment 227 to join segment 230 to update display block 213. Automatic active controls may adjust the power settings without any intervention or action by an operator of the machine, such as the driver of a vehicle. Additionally or alternatively, the automatic active control setting may override or disregard the instructions from an operator, such as if the instructions from the operator do not coincide or are inconsistent or conflict with the commands of the automatic active controls. For example, if the automatic active controls reduce the power settings of the machine in order for the estimated arrival time to equal the optimum arrival time, the automatic active controls may cause an increase power setting instruction from an operator, such as depressing a gas pedal in a vehicle, to be ignored.

Update display block 213 may provide an indication of the estimated arrival time in relation to the optimum arrival time. For example, the display may indicate that the machine is estimated to arrive two minutes earlier than the optimum arrival time. Update display block 213 may provide an indication if automatic controls are being utilized to modify the power settings of the machine. For example, the display may indicate that the power settings have been reduced or increased in order for the estimated arrival time to equal the optimum arrival time.

Continuing with FIG. 2 for further explanation of the example embodiment, not to be construed as limited to the example, the power setting for the vehicle becomes effectively three variants in the example: unmodified, reduced and increased. In another embodiment, the reduced power setting may be stepped or tapered levels of reduction. In another embodiment, the increased power setting may be stepped or tapered levels of increase. In another embodiment, the stepped return in block 231 to normal power setting may be different than the modification block steps taken at block 224 or at block 226. In another embodiment, the normal unmodified power setting may be a setting level adjusted for actual site conditions based on some desired performance characteristic level that is not a generic machine standard level. For example, the generic machine standard desired level of engine power during the hauling portion of a haul cycle may be lower than the desired level of engine power during the hauling portion of a haul cycle occurring in a cold weather environment.

Figure 4:
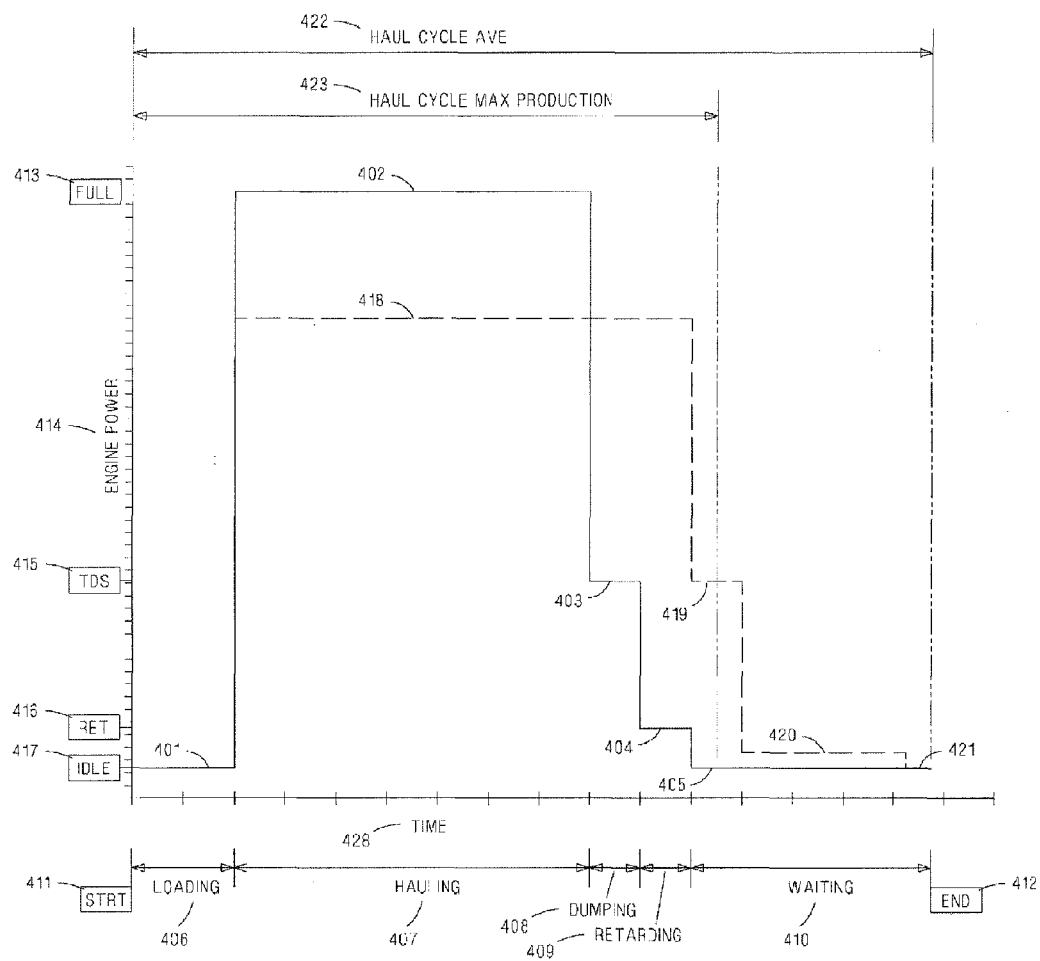
FIG. 4 is a graph of an example power usage during an application of a haul truck according to one embodiment.

FIG. 4 shows an exemplary application of vehicle 101 as an off-highway mining haulage truck with y-axis scale of engine power 414 and x-axis scale of time 428. A typical haul cycle time 422 is shown with a normal operation application with segments 401 through 405 inclusively. The exemplary embodiment of modified operation is depicted with segments 418 through 421 which correspond to segments 402 through 405, respectively. The normal operation application path from start 411 to end 412 is shown on a second x-axis, which includes haul cycle segments of loading 406, hauling 407, dumping 408, retarding 409 and waiting 410 with their corresponding engine power shown on the y-axis at idle 417, retarding 416, turn dump and spot 415 and full 413. Also shown is a maximum production haul cycle time 423 which depicts the differing wait times of time 405 and time 421 between the normal operation and the exemplary modified embodiment operation. Wait time 405 of the normal operation may be longer than wait time 421 of the exemplary embodiment operation, as shown. As discussed above, reducing the wait time may be advantageous for a variety of reasons, such as vehicle efficiency and maintenance. Also shown in FIG. 4, the maximum engine power required for the exemplary modified embodiment operation 418 may be lower than the maximum engine power required for the normal operation application 402.

Figure 5:
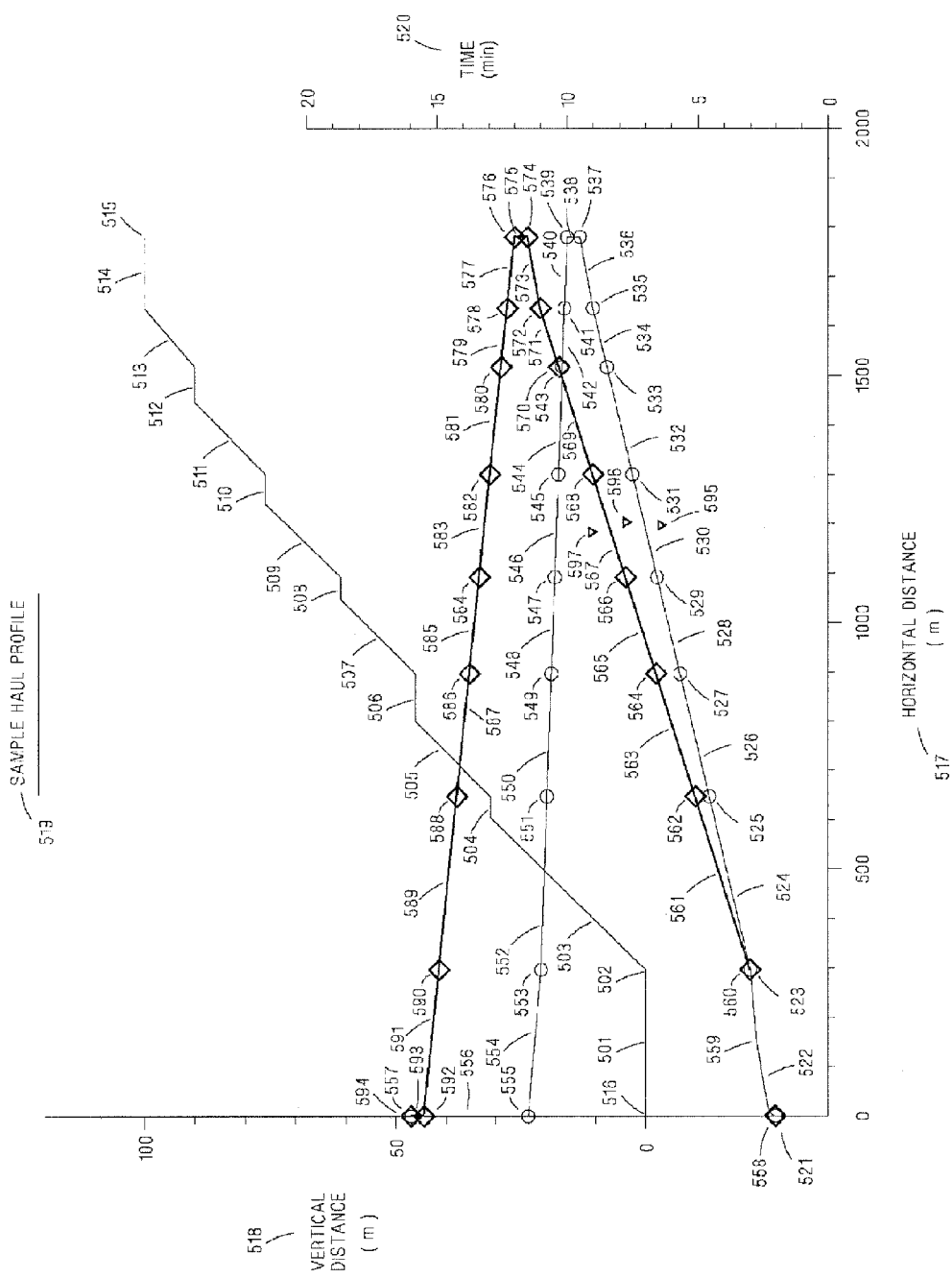
FIG. 5 is a graph of an example haul profile overlaid with example time plots for a common x-axis distance according to one embodiment.

FIG. 5 shows an example of operating conditions of an exemplary application of vehicle 101 as an off-highway mining haulage truck. The sample haul profile 519 with x-axis scale 517 of horizontal distance and y-axis scale 518 of vertical distance begins with zero point 516 where vehicle 101 is at an earth material loading machine, such as a shovel, and when having been fully loaded is to begin movement. The vehicle 101 then maneuvers through a level segment 501 from the loading shovel area to begin its path upward at the start portion of the haulage road 502. Haulage road 502 may have ascending segments 503, 505, 507, 509, 511, 513 and short flat sections 504, 506, 508, 510, 512 in the haul profile route. Then, in turn, the vehicle 101 may encounter relatively level terrain dumping area segment 514. At the end 515 of the profile 519 the load is ejected, such as in a dumping operation. The vehicle 101 then returns via the same profile in the return direction descending back to the earth material loading shovel to again arrive at the start position 516. This round trip example type of application, in this case ascending loaded haulage and descending empty return, is an example of a haul cycle. Other haul cycles, such as the reverse of the example, may be possible.

FIG. 5 also contains a graphical representation of time on a y-axis scale 520 relative to the x-axis scale 517 distance along the haul cycle. Line segments 521 through 537 (which include circular operating points) depict the time to distance characteristic for a maximum speed production usage of the vehicle 101, and also correspond to FIG. 4 graph segments 401 through 405, respectively. Line segments 540 through 554 depict the time to distance characteristic of a return trip after a dumping operation for a maximum speed production usage of the vehicle 101. The y-axis scale 518 of vertical distance is not applicable to line segments 521 through 554. The return trip may take less time than the trip to the dumping area because the vehicle 101 may utilize higher speeds when returning, such as if the dumping occurs at a higher elevation and the loading occurs at a lower elevation. The starting point of the vehicle is noted at point 521 and the return of the vehicle 101 to the same location is noted at point 555. The waiting queue time in this case is shown from the vertical line segments starting at point 555 with segment 556 to point 557, which correspond to FIG. 4 graph segment 405.

FIG. 5 also contains a graphical representation of an optimized characteristic time to distance line with time on a y-axis scale 520 to the x-axis scale 517 distance along the haul cycle. The starting point of the vehicle is noted at point 558, and the line includes points and line segments 559 through 574 (which include diamond shaped operating points) inclusively, which correspond to FIG. 4 graph segments 401, 418, 419 and 420. Line segments 577 through 591 depict the time to distance characteristic of a return trip after a dumping operation for an optimized usage of the vehicle 101. The y-axis scale 518 of vertical distance is not applicable to line segments 559 through 591. The waiting queue time in this case is shown from the vertical line segments starting at point 592 with segment 593 to point 594, which corresponds to FIG. 4 graph segment 421. As shown in FIG. 4, the waiting queue time for the optimized usage of vehicle 101 may be less than the waiting queue time for the maximum speed usage of vehicle 101. Accordingly, and as discussed above, the optimized usage of vehicle 101 may be more efficient than the maximum speed usage of vehicle 101.

Figure 6:
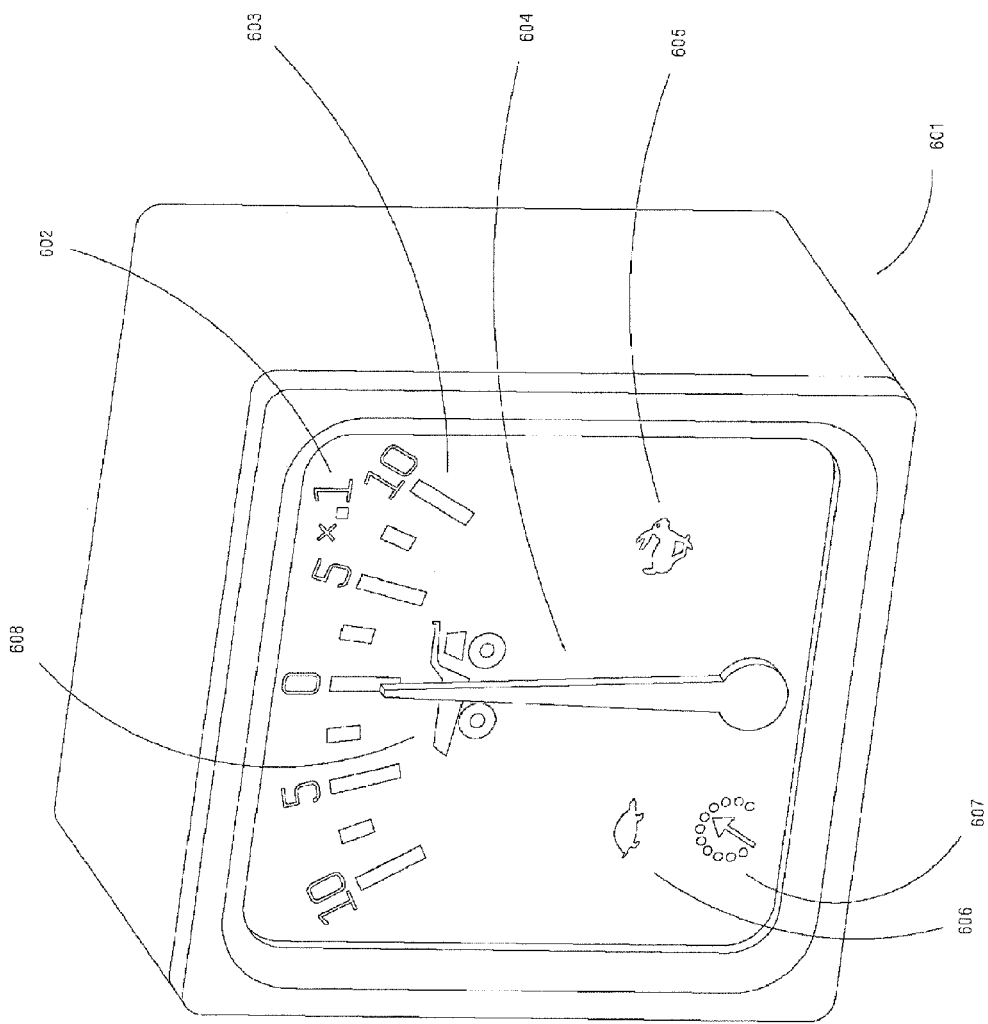
FIG. 6 is an example display interface according to one embodiment.

FIG. 6 is a representative drawing of an example display embodiment which contains an indication needle 604 with a time scale background 603, where the time scale can be in minutes or some other unit of time. Scale multiplier indicator 602 illuminates when the alternate scale multiplier is active. For example, when scale multiplier indicator 602 is illuminated, the time scale may be in tenths of minutes as opposed to minutes. Indicator 606 is for notification that the machine modification is active for slower speeds, such as when automatic active controls has reduced the power settings of a vehicle. Indicator 605 is for notification that the machine modification is active for higher speeds, such as when automatic active controls has increased the power settings of a vehicle. Indicator 607 is for notification that machine active performance controls are adjusting the performance of the machine automatically according to an algorithm for tracking the course path to achieve the desired time of destination arrival. For example, indicator 607 may activate when the automatic active controls are adjusting the speed of the vehicle, similar to cruise control, in order for the vehicle to reach a destination at an optimum time. Symbol 608 represents the vehicle.

Figure 7:
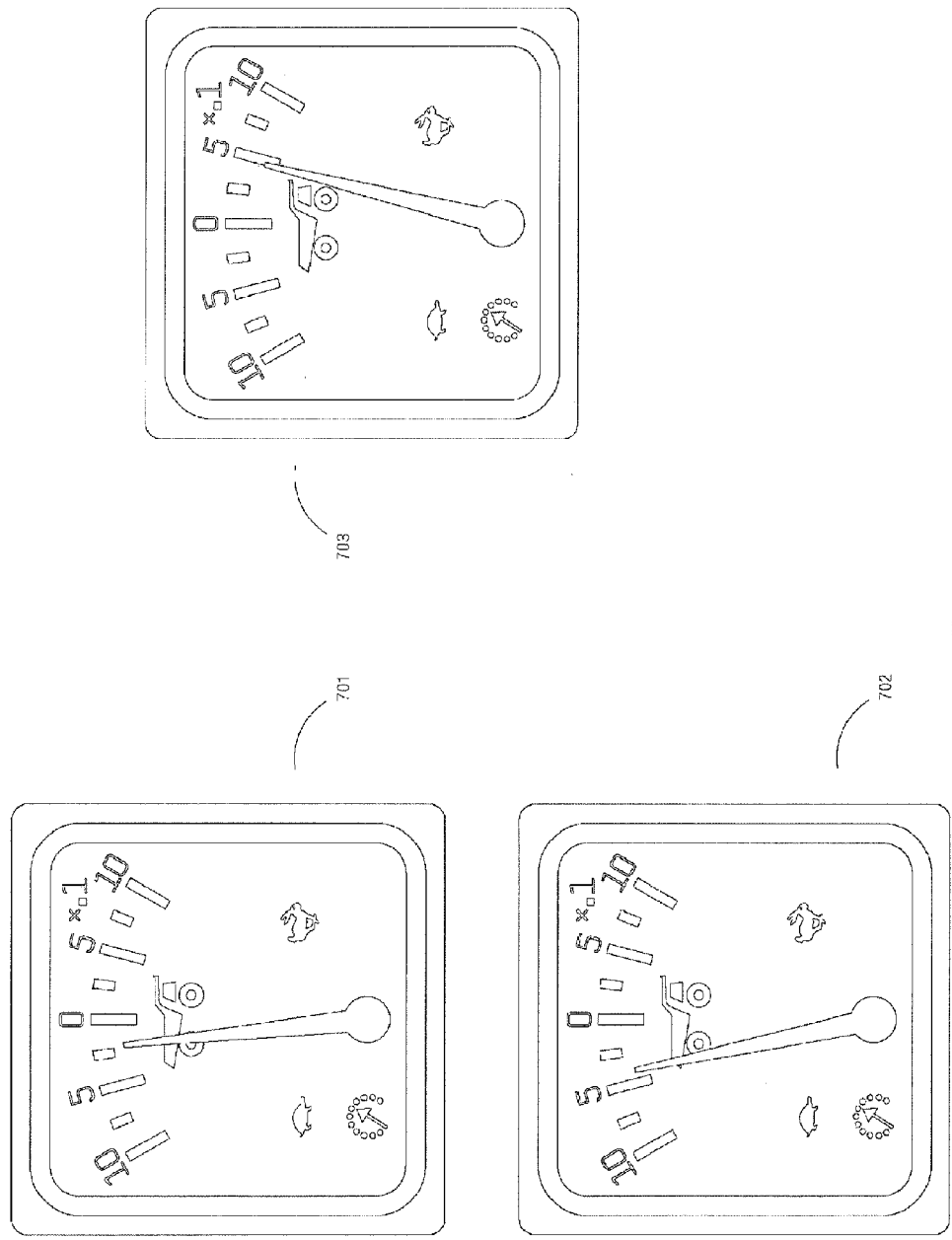
FIG. 7 is an example display interface with various indications shown according to one embodiment.

FIG. 7 is a representative drawing of example display embodiment with differing indications shown. An indication of about two minutes ahead of the optimum arrival time and early calculated arrival time is shown in indication 701. As shown in indication 701, the symbol 608 is ahead of needle 604, indicating that the vehicle is ahead of schedule. An indication of about four minutes ahead of the optimum arrival time and early calculated arrival time is shown in indication 702. As in indication 701, the symbol 608 is ahead of needle 604, indicating that the vehicle is ahead of schedule. In both indications 701 and 702, the vehicle power settings may be reduced by automatic active controls in order for the estimated arrival time to meet the optimum arrival time. An indication of about five minutes behind the optimum arrival time and late calculated arrival time is shown in indication 703. As shown in indication 703, the symbol 608 is behind needle 604, indicating that the vehicle is behind schedule. In indication 703, the vehicle power settings may be increased by automatic active controls in order for the estimated arrival time to meet the optimum arrival time. Indication 701 would correspond to about point 596 in FIG. 5, which is approximately two minutes below the optimized usage line of vehicle 101. Indication 702 would correspond to about point 595 in FIG. 5, which is approximately four minutes below the optimized usage line of vehicle 101. Shifting the optimized usage line down to points 596 and 595 would correspondingly shift the return portion of the optimized usage line segment down, which would shift the end point 592 of the optimized usage line down to an earlier time. Indication 703 would correspond to about point 597 in FIG. 5, which is approximately five minutes above the optimized usage line of vehicle 101. Shifting the optimized usage line up to point 597 would correspondingly shift the return portion of the optimized usage line segment up, which would shift the end point 592 of the optimized usage line up to a later time.

Figure 8:
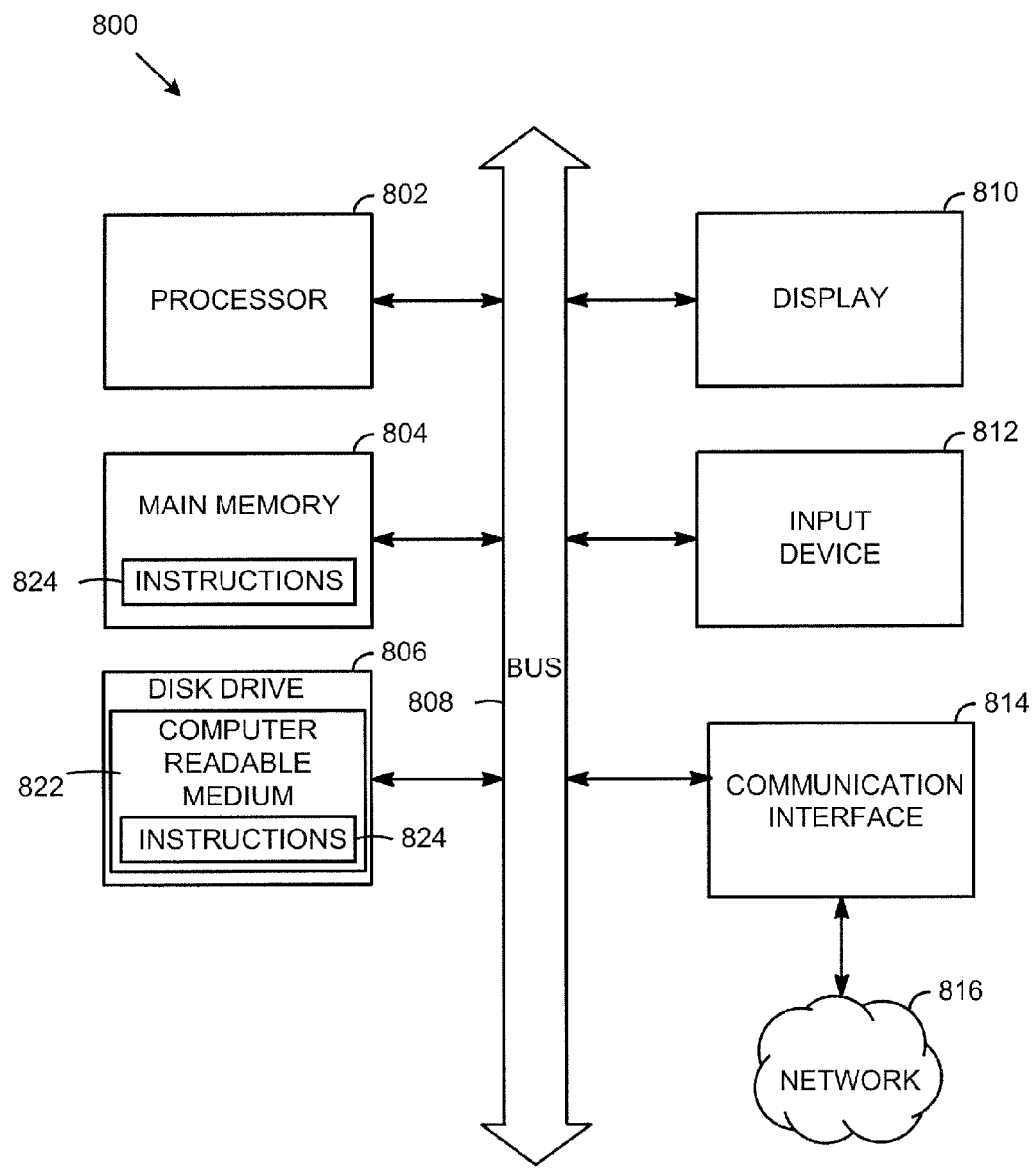
FIG. 8 is an example controller unit according to one embodiment.

FIG. 8 is an illustrative example of an embodiment of a controller unit 800 usable and configured to run any of the vehicles, processes, or display interfaces as described in relation to FIGS. 1-7. The controller unit 800 may include a processor 802, such as, a central processing unit (CPU), a graphics processing unit (GPU), or both. The processor 802 may be one or more general processors, digital signal processors, application specific integrated circuits, field programmable gate arrays, servers, networks, digital circuits, analog circuits, combinations thereof, or other now known or later developed devices for analyzing and processing data. The processor 802 may implement a software program, such as code generated manually (i.e., programmed).

The controller unit 800 may include a memory 804 that can communicate via a bus 808. The memory 804 may be a main memory, a static memory, or a dynamic memory. The memory 804 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 804 may include a cache or random access memory for the processor 802. Alternatively or in addition, the memory 804 may be separate from the processor 802, such as a cache memory of a processor, the system memory, or other memory. The memory 804 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 804 may be operable to store instructions 824 executable by the processor 802. The functions, processes, acts or tasks illustrated in the figures or described herein may be performed by the programmed processor 802 executing the instructions 824 stored in the memory 804. Alternatively or in addition, the instructions 824 for carrying out the functions, process, acts or tasks described herein may be embedded in hardware, software, or some combination of both, such as ROM in the controller. The functions, processes, acts or tasks may be independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

The controller unit 800 may further include, or be in communication with, a display 810, such as a liquid crystal display (LCD), an organic light emitting diode (OLED), a flat panel display, a solid state display, a cathode ray tube (CRT), a projector, a printer or other now known or later developed display device for outputting determined information. The display 810 may operate similarly to the display embodiments described in reference to FIGS. 6 and 7. The display 810 may act as an interface for the user to see the functioning of the processor 802, or specifically as an interface with the software stored in the memory 804 or in the drive unit 806.

Additionally, the controller unit 800 may include, or be in communication with, an input device 812 configured to allow a user to interact with any of the components of controller unit 800. The input device 812 may be a number pad, a keyboard, or a cursor control device, such as a mouse, or a joystick, touch screen display, remote control or any other device operative to interact with the controller unit 800. The input device 812 may be part of display 810.

The controller unit 800 may also include a disk or optical drive unit 806. The disk drive unit 806 may include a computer-readable medium 822 in which one or more sets of instructions 824, e.g. software, can be embedded. Further, the instructions 824 may perform one or more of the methods or logic as described herein. The instructions 824 may reside completely, or at least partially, within the memory 804 and/or within the processor 802 during execution by the controller unit 800. The memory 804 and the processor 802 also may include computer-readable media as discussed above.

The present disclosure contemplates a computer-readable medium 822 that includes instructions 824 or receives and executes instructions 824 responsive to a propagated signal; so that a device connected to a network 816 may communicate voice, video, audio, images or any other data over the network 816. Further, the instructions 824 may be transmitted or received over the network 816 via a communication interface 814. The communication interface 814 may be a part of the processor 802 or may be a separate component. The communication interface 814 may be created in software or may be a physical connection in hardware. The communication interface 814 may be configured to connect with a network 816, additional devices, external media, the display 810, or any other components in controller unit 800, or combinations thereof. The connection with the communication interface 814 may be a physical connection, such as a RS-232 connection, wired Ethernet connection, wireless connection as discussed below, or any other type of connection. Likewise, the additional connections with other components of the controller unit 800 may be physical connections or may be established wirelessly.

The network 816 may include additional devices used in conjunction with wired networks, wireless networks, or combinations thereof. The wireless network may be a cellular telephone network, an 802.11, 802.16, 802.20, or WiMax network. Further, the network 816 may be a public network, such as the Internet, a private network, such as an intranet, or combinations thereof, and may utilize a variety of networking protocols now available or later developed including, but not limited to TCP/IP based networking protocols.

The computer-readable medium 822 may be a single medium, or the computer-readable medium 822 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 822 may include a solid-state memory such as a memory card or other package that houses one or more non-volatile read-only memories. The computer-readable medium 822 also may be a random access memory or other volatile re-writable memory. Additionally, the computer-readable medium 822 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

The vehicles, processes, display interfaces, and controllers described in relation to FIGS. 1-8 solve the problems addressed in the Background section by providing a means to adjust the estimated arrival time of a vehicle, which optimizes the vehicle arrival moment in terms of many possible metrics such as fuel burn, temperature stabilization of a system such as an exhaust system, power output stabilization average, engine coolant systems, operator cab heater systems, etc., for when the operation manner of maximum power with minimum amount of travel time yields an amount of extra time waiting in the waiting queue.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A method for adjusting the arrival time of a vehicle at a destination, the method comprising:
  determining a real-time position of the vehicle relative to a stored optimum path of the vehicle for a haul cycle;
  determining a real-time speed of the vehicle;
  determining an estimated arrival time of the vehicle at a destination along the optimum path based on the determined real-time speed and the determined real-time position of the vehicle relative to the stored optimum path;
  determining a deviation of the estimated arrival time from a stored optimum arrival time at the destination;
  initiating automatic control of the vehicle, wherein the automatic control comprises:
    reducing a power setting of the vehicle without intervention by a vehicle operator if the estimated arrival time is before the stored optimum arrival time;
    determining if the vehicle can achieve the stored optimum arrival time by using a maximum power setting of the vehicle, wherein the maximum power setting is not available without automatic control of the vehicle;

increasing the power setting of the vehicle without intervention by the vehicle operator if the estimated arrival time is after the stored optimum arrival time and if the vehicle can achieve the stored optimum arrival time by using the maximum power setting of the vehicle.

2. The method according to claim 1, wherein the optimum path is a sequence of arrival times of the vehicle at locations along the vehicle haul cycle.

3. The method according to claim 1, wherein the optimum path is a sequence of locations of the vehicle at times within the vehicle haul cycle.

4. The method according to claim 1, wherein the vehicle is an off-highway dump truck and wherein the vehicle haul cycle includes the vehicle being loaded at a first location, the vehicle traveling to a second location, and the load being removed from the vehicle at the second location, wherein the first location is different than the second location.

5. The method according to claim 1, wherein the automatic control further comprises:
updating a display module to indicate the reduced power setting or the increased power setting; and
updating the display module to indicate if the estimated arrival time is before or after the stored optimum arrival time.

6. The method according to claim 1, further comprising:
determining if valid vehicle data is available;
determining if automatic control of the vehicle is active;
if valid vehicle data is not available and if automatic control of the vehicle is active:
instructing the vehicle through the automatic control to modify a setting of the vehicle so that the vehicle setting moves toward an inactive automatic control level of the setting;
determining if the setting of the vehicle is near the inactive automatic control level of the setting;
adjusting the setting of the vehicle to be equal to the inactive automatic control level of the setting;
updating the display module to indicate that automatic control is not modifying the setting of the vehicle.

7. The method according to claim 6, wherein the setting of the vehicle is a power setting.

8. The method according to claim 1, further comprising overriding an instruction from the vehicle operator if the instruction from the vehicle operator conflicts with the setting dictated by the automatic control of the vehicle.

9. The method according to claim 1, wherein a wait time of the vehicle at the destination is less when the optimum arrival time is achieved than when the optimum arrival time is not achieved.

10. The method according to claim 1, wherein the vehicle following the optimum path results in a higher vehicle efficiency characteristic as compared to the vehicle not following the optimum path.

11. The method according to claim 10, wherein the vehicle efficiency characteristic includes at least one of:
a vehicle waiting time;
a vehicle idle time;
a catalyst exhaust system performance; and
an operator cabin heat generation.

12. The method according to claim 1, wherein reducing the power setting includes stepped levels of reduction.

13. The method according to claim 1, wherein increasing the power setting includes stepped levels of increase.

14. The method according to claim 1, wherein the display module comprises:
a symbol representing the vehicle;
a time scale;
a time scale multiplier configured to modify a size of the time scale;
an indication member configured to denote a position on the time scale, wherein the position of the indication member relative to the symbol indicates if the estimated arrival time of the vehicle is before or after the stored optimum arrival time; and
a power setting modification indicator configured to indicate the reduced power setting and the increased power setting.

15. A method for storing characteristic information of a vehicle along a path, the method comprising:
receiving information regarding characteristics of the vehicle at points along a vehicle path;
storing the received information regarding characteristics of the vehicle in a memory, wherein the memory is configured to store multiple iterations of vehicle characteristics along the vehicle path;
determining if the vehicle as at the end of the path;
if the vehicle is at the end of the path:
determining that an acceptable average set of vehicle characteristics along the vehicle path is not stored;
retrieving stored vehicle characteristics from the memory;
generating vehicle characteristics along the vehicle path from the stored vehicle characteristics;
storing the generated vehicle characteristics along the vehicle path in the memory;
generating an acceptable average set of vehicle characteristics along the vehicle path from the generated vehicle characteristics along the vehicle path;
if the vehicle is not at the end of the path:
determining that an acceptable average set of vehicle characteristics along the vehicle path is stored;
determining a deviation of the information regarding characteristics of the vehicle from the average set of vehicle characteristics along the vehicle path;
determining, based on the determined deviation, if the vehicle is on the path.

16. The method according to claim 15, wherein the step of generating vehicle characteristics along the vehicle path from the stored vehicle characteristics further comprises:
deriving vehicle characteristics from the received information regarding characteristics of the vehicle;
adding the derived vehicle characteristics to the stored vehicle characteristics in order to generate vehicle characteristics along the vehicle path.

17. A display module for an off-highway dump truck vehicle comprising:
a symbol representing the vehicle;
a time scale;
a time scale multiplier configured to modify a size of the time scale;
an indication member configured to denote a position on the time scale, wherein the position of the indication member relative to the symbol indicates if an estimated arrival time of the vehicle at a destination is before or after a stored optimum arrival time, wherein the estimated arrival time of the vehicle is determined based on a real-time speed and a real-time position of the vehicle relative to a stored optimum path; and
a power setting modification indicator configured to indicate if a reduced power setting or an increased power setting is active, wherein the reduced power setting is activated without intervention by a vehicle operator if the estimated arrival time is before the stored optimum arrival time, and wherein the increased power setting is activated without intervention by the vehicle operator if the estimated arrival time is after the stored optimum arrival time and if the vehicle can achieve the stored optimum arrival time by using a maximum power setting of the vehicle, wherein the maximum power setting is not activatable by the vehicle operator.

18. The display module of claim 17, further comprising an active performance control indicator configured to indicate that a speed of the vehicle is being automatically controlled without intervention by a vehicle operator.

19. The display module of claim 17, wherein the time scale is in minutes and wherein the time scale is in a fraction of minutes when the time scale multiplier is active.

20. The display module of claim 17, wherein the stored optimum path is a sequence of arrival times of the vehicle at locations along a vehicle haul cycle or a sequence of locations of the vehicle at times within the vehicle haul cycle.

* * * * *